Dec. 17, 1957

G. L. STOCKING 2,816,646

DEVICE FOR REARRANGING A LINE OF CARTONS INTO A PLURALITY OF LINES

Filed Nov. 2, 1955

INVENTOR.
GEORGE L. STOCKING,
BY Allen & Allen
ATTORNEYS.

Dec. 17, 1957    G. L. STOCKING    2,816,646
DEVICE FOR REARRANGING A LINE OF CARTONS
INTO A PLURALITY OF LINES
Filed Nov. 2, 1955    2 Sheets-Sheet 2
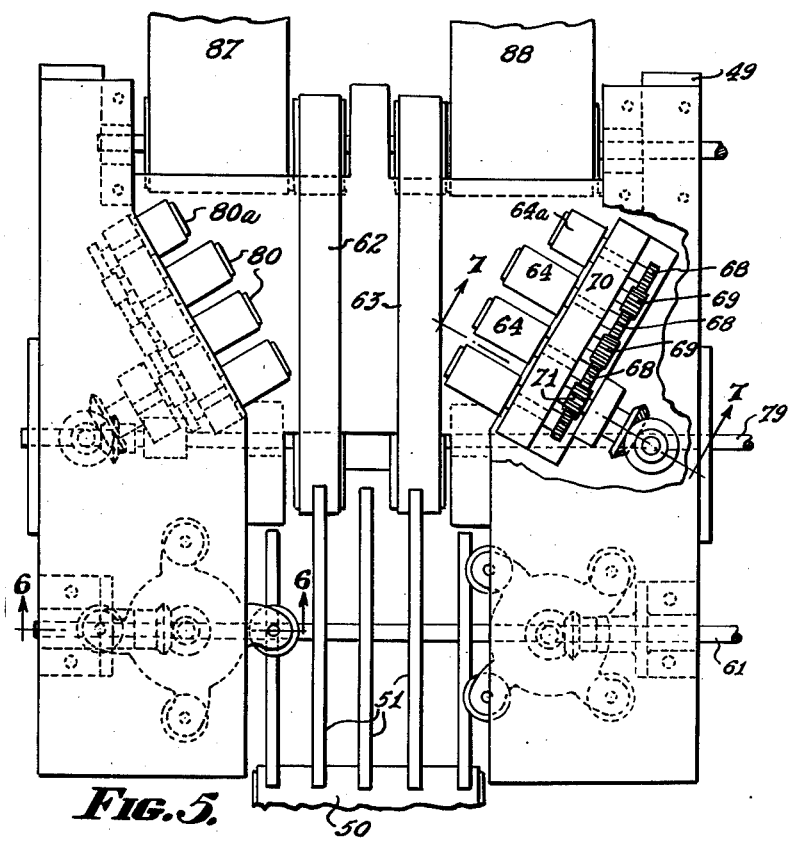
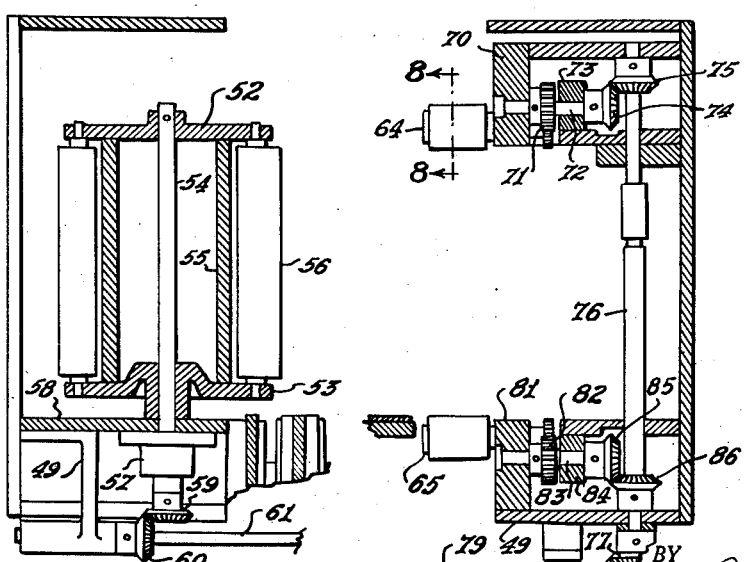
INVENTOR.
GEORGE L. STOCKING,
BY
ATTORNEYS.

United States Patent Office 2,816,646
Patented Dec. 17, 1957

2,816,646

DEVICE FOR REARRANGING A LINE OF CARTONS INTO A PLURALITY OF LINES

George L. Stocking, Hamilton, Ohio, assignor to The Procter & Gamble Company, Cincinnati, Ohio, a corporation of Ohio Application November 2, 1955, Serial No. 544,541

14 Claims. (Cl. 198—31)

The invention relates to mechanism for separating a single line or single file of objects into two or more lines or files.

A primary field of utility for the device lies in producing two or more lines of filled and sealed cartons, proceeding in a direction transverse to their major horizontal dimension as the cartons approach a point at which they will be loaded into shipping cases or other containers. In particular, automatic or semi-automatic devices for packing cartons into shipping cases operate more efficiently if the cartons as they are brought to the loading point are already formed into groups which will fill the container from wall to wall. Thus, in one aspect of utility the structure herein described may be considered as adjunctive to a mechanical system in which cartons are erected, closed on one end, filled with a measured quantity of contents, closed on the other end, and packed into shipping cases. The structure will be described in an exemplary embodiment suitable for use in this environment, although such use does not form a limitation on the invention.

In the past, apparatus for arranging cartons traveling in a direction transverse to their major horizontal dimension into a plurality of lines or files involved intermittently acting members, the cartons being diverted from one line to another by a reciprocating element. Such apparatus has not proved satisfactory because of the intermittent activity; and such apparatus has been found unsuitable for use with high speed cartons filling, closing and loading devices because rapid movements of reciprocating devices have a tendency to damage the cartons.

A primary object of the invention, therefore, is the provision of a mechanism of continuously acting character, permitting operations at much higher speeds.

Another object of the invention is to provide a mechanism which will serve to rearrange cartons or other objects as aforesaid smoothly, rapidly and without damage.

These and other objects of the invention which will be set forth hereinafter or will be apparent to one skilled in the art upon reading these specifications are accomplished in that construction and arrangement of parts of which the aforesaid exemplary embodiment will now be described. Reference is made to the accompanying drawings wherein:

Figure 5 is a plan view with parts broken away of another form of apparatus suitable for the purpose.

Figure 6 is a sectional view of mechanism taken along the line 6—6 of Figure 5.

Figure 7 is a sectional view of mechanism taken along the line 7—7 of Figure 3.

Figure 8 is a transverse sectional view of a conveyor roller taken along the line 8—8 of Figure 7.

Figure 1:
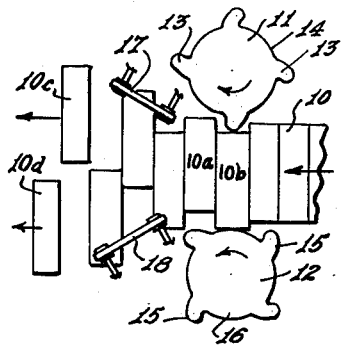
Figure 1 is a diagrammatic representation of the manner of operation of a form of a device for rearranging a single file of cartons into a double file.
Figure 2:
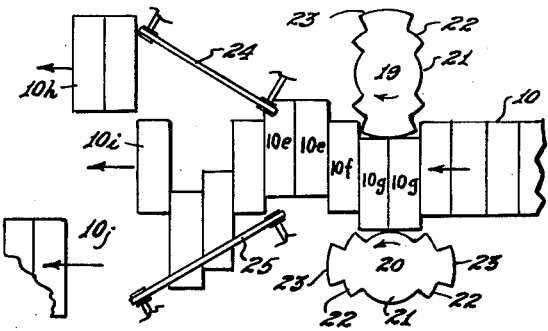
Figure 2 is a diagrammatic representation of means for rearranging a single file of cartons into three files or lines.

Briefly, in the practice of the invention for forming a double file of cartons from a single file, the single file of cartons is moved forwardly on or under the influence of a conveyor, as at 10 in Figure 1. As the file is so moved forward, the cartons come between rotating members 11 and 12. These members, conveniently referred to as wheels, are characterized by spaced teeth and recesses on their peripheries. Thus, in the diagrammatic showing, the wheel 11 is provided with spaced teeth 13 and intervening recesses 14, while the wheel 12 has teeth 15 and intervening recesses 16. The wheels are so related, as for example, by interconnecting their respective shafts with sprockets and a chain, or by a shaft and bevel gears, that as they rotate, a tooth of one wheel will lie opposite the center of a recess of the other wheel across the file of cartons. The teeth of each wheel, in the particular embodiment, are so spaced that they will displace every other carton in the file. The wheels move oppositely in the direction of the arrows at peripheral speeds which are the same as the linear speed of travel of the carton file. Preferably they are rotated merely by engagement with the cartons so as to be self-timing irrespective of the rate of carton feed; but driving means may be employed if desired. In either event the result of the operation is a movement of alternate cartons in the file a short distance in opposite lateral directions. Thus the carton 10a will be moved by the wheel 12 a certain distance laterally of the direction of movement of the file, while the next carton 10b will be moved a certain distance in the opposite direction by the wheel 11, and so on. Since the wheels turn with the cartons, they need not produce sharp or jerky movements thereof, so that carton damage is eliminated; and the teeth of the wheels may be fitted with rollers or the like to minimize scuffing of the cartons.

The cartons are moved alternately laterally far enough to come under the influence of diagonally arranged or slantwise conveyors 17 and 18. These conveyors may take several forms, as will later be explained. The form illustrated in Figures 1 to 4 inclusive comprise upper and lower friction belts passing over sheaves on suitable shafts, although if the cartons or articles are short in the vertical dimension, the upper belts may be omitted. The slantwise conveyors will be driven at such a speed that the component of movement in the direction of motion of the file of the cartons is equivalent to the speed of movement of the file. Thus the cartons are alternately moved laterally without tilting or turning; and the length of the slantwise conveyors is such as to produce at least a complete lateral separation of the cartons as will be seen at 10c and 10d. When the cartons have been separated laterally, as indicated, they continue to move forwardly in the direction of the arrows under the influence of conveyors (not shown in Figure 1). If these conveyors move at half the speed of the original file, the cartons in the resulting two files will be brought together so as immediately to follow each other, as will be clear. While the operation has been described as involving the alternate displacement of succeeding cartons, it will be evident that the wheels may be so arranged as to displace laterally alternate groups of cartons; and this may be found advantageous if the cartons are thin.

Similar principles may be applied to the formation of more than two files of cartons. As diagrammed in Figure 2, the file 10 may be passed between wheels 19 and 20, the surfaces of which are configured to form recesses 21, intermediate-level portions 22, and high-level portions or teeth 23. The result of the operation of these wheels will be to deflect a pair of cartons in one lateral direction as at 10e, to leave the next carton in alignment with the original file as at 10f, and to deflect the next pair of cartons in the opposite lateral direction as at 10g, and so on. The deflected cartons next come under the influence of slantwise disposed conveyors 24 and 25 which move them a further distance laterally as explained above, thus arranging the cartons into three lines or files respectively indicated at 10h, 10i, and 10j in Figure 2.

Figure 3:
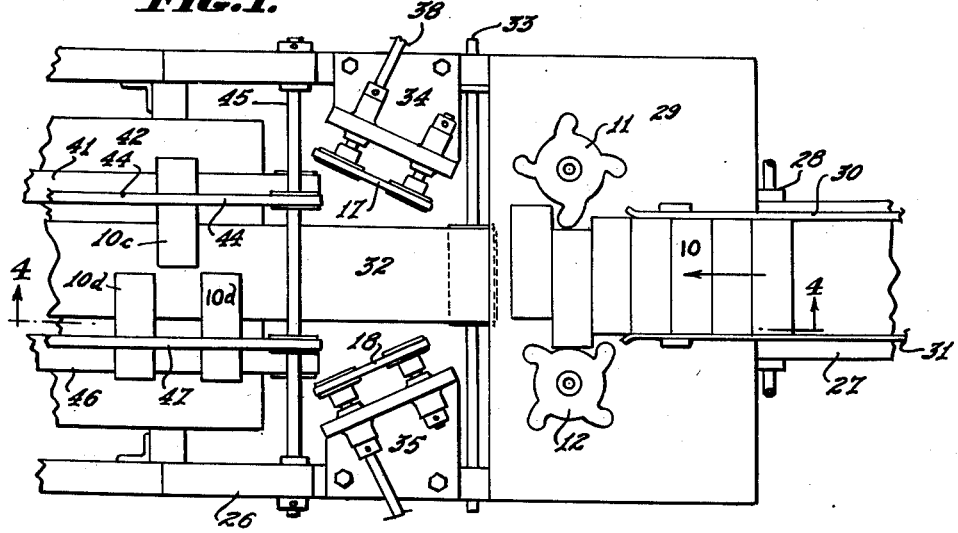
Figure 3 is a partial plan view of a form of the specific apparatus for the purpose.

Figure 3 shows a machine embodiment in which the frame of the machine is indicated at 26. An initial belt conveyor 27, returning over a roll 28 on a driven shaft carries a single file of cartons to a table 29. The conveyor and table may be provided with side guides 30 and 31. The cartons traveling over the table come between the deflecting wheels which are again numbered 11 and 12.

When the cartons have been deflected as indicated, they are carried away from the table 29 by a belt conveyor 32 which returns over a roll on a shaft 33 at the forward edge of the table; and the cartons are carried into the slantwise conveyors heretofore described. At each side of the machine a bracket 34 or 35 is affixed to the frame. Each slantwise conveyor has an upper and a lower belt engaging cartons at their tops and bottoms. As will be evident from Figure 4, the right hand slantwise conveyor has the upper belt 17 passing over sheaves 36 and 37 on shafts journaled in a vertical leg of the bracket 34. One of the shafts will be prolonged as at 38 (Figure 3) so that it may be provided with a driving connection. The slantwise conveyor also comprises a lower belt 17a passing over sheaves 39 and 40 on shafts similarly journaled. The construction of the left hand slantwise conveyor will be the same but of opposite hand. As the deflected cartons are engaged by the slantwise conveyors and drawn apart laterally to form two files, their inner or adjacent bottom portions are supported by the belt 32.

When the cartons have been separated as described, they are engaged by supplementary conveying equipment for each file. Thus the file comprising cartons 10c is engaged by a lower belt conveyor 41 passing over a table 42 and returning over a roll on a shaft 43, and by an upper belt 44 returning over a roll on a shaft 45. Similarly, the file made up of the cartons 10d is engaged at its bottom by a belt conveyor 46 returning over a roll on the shaft 43 and by an upper belt 47 returning over another roll on the shaft 45. The upper belts may have spaced pressure sheaves, as known in the art. One of these sheaves is shown at 48 in Figure 4.

Figure 4:
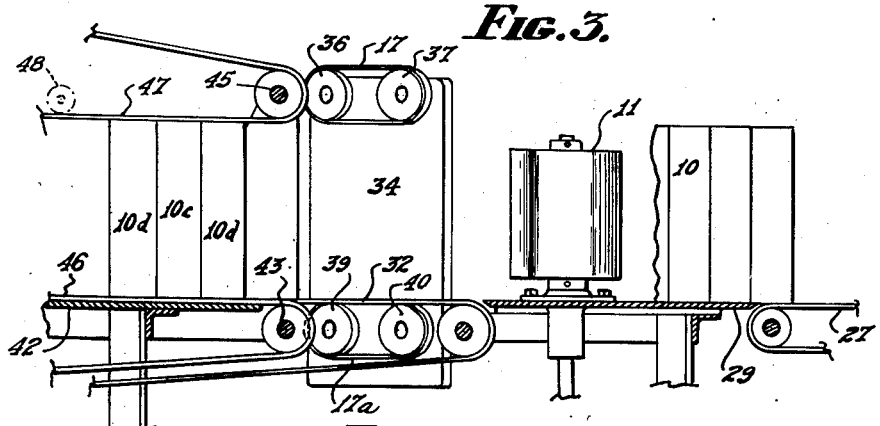
Figure 4 is a longitudinal section thereof taken along the line 4—4 of Figure 3.

Drives have not been indicated in Figures 3 and 4 since it will be well within the skill of the worker in this art to provide drives for causing the various parts to move in synchronism. Since the cartons remain in engagement with the conveyor 32 as they are being separated by the slantwise conveyors, and since the conveyor 32 must therefore move at the same speed as the conveyor 27, the supplementary conveyors 41 and 46 also moving at that speed, it will be evident that the cartons after separation into the two files will be interspaced therein as shown. They can be brought against each other in the two files subsequently if desired. The wheels 11 and 12 may be of the drum form hereinafter described.

Referring to Figures 5 to 8 inclusive, a modified machine is shown. This machine has a frame 49. The cartons are brought to the mechanism in single file on a conveyor 50 and are transferred to a support consisting of spaced rods 51 on which they pass between the wheels.

The wheels may be constructed as shown in Figure 6 and may comprise upper and lower spiders 52 and 53 affixed to a shaft 54 and held apart by a cylindrical spacer 55. The elements which deflect the cartons may be rollers 56 journaled between the arms of the spiders. The cartons can thus be contacted for deflection substantially throughout their entire height.

The vertical shaft 54 may be journaled as at 57 on a bracket 58 affixed to the machine frame. The shaft may be provided at its lower end with a bevel gear 59 meshing with a bevel gear 60 on a drive shaft 61 which, extending across the machine, may be similarly connected to the vertical shaft of the opposite deflecting wheel.

In the mechanism of Figures 5 to 8 the slantwise conveyors are each made up of an upper and lower series of rolls closely spaced in echelon. The axes of these rollers are arranged slantwise to the original direction of travel of the cartons, and the effect of the rollers is to engage deflected cartons and draw them apart laterally in substantially the same way as the slantwise disposed belts hereinabove described. While the cartons are being so drawn apart, their inner ends may be supported by a pair of conveyors 62 and 63 which will be driven at the same speed as the conveyor 50.

The separating means on the right hand side comprises an upper series of slantwise rolls 64 and a lower series of slantwise rolls 65. As shown in Figure 8 each of these rolls has a metallic core 66 and a covering 67 of rubber or other resilient frictional substance. The rolls have projecting shafts at their outer ends, which shafts are provided with pinions 68 engaging intermediate idler gears 69. The shafts are journaled in a bracket 70. The idler gears are journaled on stub shafts on the bracket. One of the intermediate gears, however, namely the gear 71, is affixed to a shaft 72 journaled in a bracket 73. The shaft bears at its outer end a bevel gear 74 meshing with a bevel gear 75 on a vertical shaft 76. This shaft may be made telescopic as shown if vertical height adjustability is desired. The vertical shaft at its lower end carries a bevel gear 77 meshing with a bevel gear 78 on a horizontal shaft 79. This shaft, extending across the machine is the means by which power can be applied to both sets of upper and lower rolls. The rolls of the upper left hand set are indicated in Figure 5 at 80. The lower right hand set of rolls (65 in Figure 7) is arranged similarly. The roll shafts are journaled in the bracket 81. The intermediate gear 82 is affixed to a shaft 83 journaled in a bracket 84. This shaft carries a bevel gear 85 meshing with a bevel gear 86 on the vertical shaft 76. The several rollers will be of the same diameter and, by the means hereinabove described, will be driven in the same direction and at the same peripheral speeds. The forward roller in each group may be shorter than the others, as indicated at 64a and 80a in Figure 5, if necessary to cause the lateral movement to end at the desired point.

When the cartons, having now been separated into a plurality of files, are released by the slantwise conveyors, they are picked up in the mechanism of Figure 5 by the spaced conveyors 87 and 88. If these conveyors move at the same speed as the conveyor 50, the cartons in the two files which are formed will be separated from each other on the conveyors 87, 88. If, however, these conveyors are driven at half the speed of the entering conveyor 50, the cartons in the two resultant files will be brought against each other. The spacing between cartons can be controlled by controlling the differential speeds of the conveyors.

So long as the cartons are separated into two or more distinct files, the distance separating the resulting files from each other is not a limitation on the invention, and may be increased by elongating the slantwise conveyors and their appurtenances. A wide separation of the resultant files may be desirable, as for example, when the mechanism of this invention is used to divide a single file of objects into two or more separated files feeding two or more subsequent mechanisms for treating the objects.

In the mechanisms of this invention all moving parts have a continuous smooth motion and are capable of acting at high speeds without damaging cartons or other objects being positioned. At the start of an operation it is necessary to make sure that the original single file of objects or cartons is correctly synchronized with the deflecting wheels. Once such synchronization or priming has been attained, however, the operation of the apparatus is smooth and automatic.

Modifications may be made in apparatus without departing from the spirit of the invention. The invention having been described in certain exemplary embodiments, what is claimed as new and desired to be secured by Letters Patent is:

1. In a device for rearranging uniform objects, the combination of conveyor means on which a file of objects is brought to a separation station, toothed, rotary means for producing lateral displacement of spaced objects in said file during continuous motion thereof, and slantwise-disposed conveying means for engaging the top and bottom surface portions of laterally displaced spaced objects and moving them farther in the lateral direction until a plurality of files is formed.

2. The structure claimed in claim 1 in which said rotary means comprise a pair of oppositely-acting toothed wheels, one on either side of said file, and acting to displace non-consecutive objects alternately in opposite lateral directions, and in which a slantwise-disposed conveying means is located at each side of said file to engage the objects so displaced.

3. The structure claimed in claim 2 in which said wheels are interconnected by mechanical means to maintain their opposite activity, but in which said wheels are driven only by the objects as they move in said file.

4. The structure claimed in claim 2 in which said wheels are interconnected by mechanical means to maintain their opposite activity, and in which conveying means located between said slantwise conveying means engage inner portions of said objects to maintain their lateral alignment while they are being moved sidewise.

5. The structure claimed in claim 4 including spaced conveying means for moving said objects away from said separation station.

6. The structure claimed in claim 4 including spaced conveying means for moving said objects away from said separation station, said spaced conveying means moving at a reduced linear speed with respect to the linear speed of said conveying means located between said slantwise conveying means to bring said objects against each other in said plurality of files.

7. In a device for rearranging uniform objects, the combination of conveyor means on which a file of objects is brought to a separation station, toothed, rotary means for producing lateral displacement of spaced objects in said file during continuous motion thereof, and slantwise-disposed conveying means for engaging portions of laterally displaced spaced objects and moving them farther in the lateral direction until a plurality of files is formed, said rotary means comprising a pair of oppositely acting toothed wheels, one on either side of said file, and acting to displace non-consecutive objects alternately in opposite lateral directions, said slantwise-disposed conveying means located at each side of said file to engage the objects so displaced, said wheels interconnected by mechanical means to maintain their opposite activity, including conveying means located between said slantwise conveying means engaging inner portions of said objects to maintain their lateral alignment while they are being moved sideways, said slantwise-disposed conveying means comprising upper and lower belts.

8. In a device for rearranging uniform objects, the combination of conveyor means on which a file of objects is brought to a separation station, toothed, rotary means for producing lateral displacement of spaced objects in said file during continuous motion thereof, and slantwise-disposed conveying means for engaging portions of laterally displaced spaced objects and moving them farther in the lateral direction until a plurality of files is formed, said rotary means comprising a pair of oppositely acting toothed wheels, one on either side of said file, and acting to displace non-consecutive objects alternately in opposite lateral directions, said slantwise-disposed conveying means located at each side of said file to engage the objects so displaced, said wheels interconnected by mechanical means to maintain their opposite activity, including conveying means located between said slantwise conveying means engaging inner portions of said objects to maintain their lateral alignment while they are being moved slantwise, said slantwise-disposed conveying means comprising upper and lower sets of rotating rolls.

9. An apparatus for separating a single line of sealed rectangular cartons moving substantially horizontally along a conveying means into a plurality of separate lines, comprising two spaced parallel vertical shafts, one positioned on each side of the conveying means, each of said shafts carrying a wheel having teeth and recesses in its periphery, said wheels adapted to cooperate with one another as the cartons pass between them whereby the cartons are separated into positions where their center lines form a plurality of lines, and conveying means operatively gripping the displaced cartons between them at the top and bottom and moving said displaced cartons farther in the direction of displacement and forwardly, whereby a plurality of separate lines of cartons is achieved.

10. The structure claimed in claim 9 in which said wheels have rollers on their teeth.

11. An apparatus for separating a single line of sealed rectangular cartons moving substantially horizontally along a conveying means into two separate lines, comprising two spaced parallel shafts one positioned on each side of the conveying means, each of said shafts carrying a wheel having teeth and recesses in its periphery, said wheels having their teeth in interdigitating relationship and adapted to cooperate with one another as the cartons pass between them, whereby the cartons are moved alternately to one side and the other, slantwise-disposed conveying means operatively gripping the displaced cartons between them at top and bottom and moving said cartons farther in the direction of displacement and forwardly, whereby two separate lines of cartons are achieved.

12. An apparatus for separating a single line of sealed rectangular cartons moving substantially horizontally along a conveying means into three separate lines, comprising two spaced parallel vertical shafts, one positioned on each side of the conveying means, each of said shafts carrying a wheel having teeth, intermediate-level portions and recesses in its periphery, said wheels adapted to cooperate with one another in interdigitating relationship as the cartons pass between them, whereby two cartons are moved toward one side of the conveying means, one carton is not moved, two cartons are moved toward the other side of the conveying means, and so on, so that the center lines of the cartons are caused to fall along three separate lines, and conveying means operatively gripping the displaced cartons between them at the top and bottom and moving said displaced cartons farther in the direction of displacement and forwardly until three separate lines of cartons are achieved.

13. The apparatus of claim 12 in which the sequence is two cartons, moved in one direction, two cartons left unmoved, and two cartons moved in the other direction.

14. The apparatus of claim 12 in which the sequence is one carton moved right, one moved left, and one unmoved.

References Cited in the file of this patent

UNITED STATES PATENTS

| | | |
|---|---|---|
| 1,300,010 | Porter | Apr. 8, 1919 |
| 2,273,509 | Braren | Feb. 17, 1942 |
| 2,404,232 | Hunter | July 16, 1946 |
| 2,630,903 | Currivan | Mar. 10, 1953 |